(12) United States Patent
Liu et al.

(10) Patent No.: US 11,970,427 B2
(45) Date of Patent: Apr. 30, 2024

(54) MICROELEMENT AMINO ACID CHELATE-UREA FORMALDEHYDE SLOW-RELEASE FERTILIZER AND METHOD FOR PREPARING THE SAME BY REACTIVE EXTRUSION

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Chaoyang Wu, Taiyuan (CN); Guizhe Zhao, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 0 days.

(21) Appl. No.: 18/499,910

(22) Filed: Nov. 1, 2023

(65) Prior Publication Data

US 2024/0059625 A1 Feb. 22, 2024

Related U.S. Application Data

(63) Continuation of application No. PCT/CN2023/088415, filed on Apr. 14, 2023.

(51) Int. Cl.
- C05C 9/02 (2006.01)
- C05G 3/40 (2020.01)
- C05G 5/12 (2020.01)

(52) U.S. Cl.
CPC ............ *C05G 3/40* (2020.02); *C05C 9/02* (2013.01); *C05G 5/12* (2020.02)

(58) Field of Classification Search
CPC ............ C05G 3/40; C05G 5/12; C05C 9/02
See application file for complete search history.

(56) References Cited

U.S. PATENT DOCUMENTS

2019/0031574 A1 1/2019 Liu et al.

FOREIGN PATENT DOCUMENTS

| CN | 104557288 A | 4/2015 |
|----|-------------|--------|
| CN | 108164288 A | 6/2018 |
| CN | 112174729 A | 1/2021 |
| CN | 114195590 A | 3/2022 |

*Primary Examiner* — Jennifer A Smith

(57) ABSTRACT

This disclosure relates to slow- and controlled-release fertilizers (S-CRF), and more particularly to a microelement amino acid chelate-urea formaldehyde (UF) slow-release fertilizer and a method for preparing the same by reactive extrusion. The microelement amino acid chelate-UF slow-release fertilizer includes a biodegradable UF polymer and a microelement amino acid chelate. The macromolecular chains of the biodegradable UF polymer interpenetrate in the cross-linked network structure of the chelate, so as to form a polymer composite with a semi-interpenetrating network structure.

10 Claims, 14 Drawing Sheets

- Urea-formaldehyde
- Amino acid
- Microelements (iron, copper, zinc, boron, and manganese)
- Other elements

- Urea-formaldehyde
- Amino acid
- Microelements (iron, copper, zinc, boron, and manganese)
- Other elements

MICROELEMENT AMINO ACID CHELATE-UREA FORMALDEHYDE SLOW-RELEASE FERTILIZER AND METHOD FOR PREPARING THE SAME BY REACTIVE EXTRUSION

CROSS-REFERENCE TO RELATED APPLICATIONS

This application is a continuation of International Patent Application No. PCT/CN2023/088415, filed on Apr. 14, 2023, which claims the benefit of priority from Chinese Patent Application No. 202310130766.0, filed on Feb. 17, 2023. The content of the aforementioned application, including any intervening amendments thereto, is incorporated herein by reference in its entirety.

TECHNICAL FIELD

This application relates to slow- and controlled-release fertilizers (S-CRF), and more particularly to a microelement amino acid chelate-urea formaldehyde (UF) slow-release fertilizer and a method for preparing the same by reactive extrusion.

BACKGROUND

At present, the predominant nitrogen fertilizers only have a current quarter utilization rate of about 30% on average, and over 60% of the contained nitrogen is lost through volatilization, leaching, and runoff, resulting in serious atmospheric and water pollution. As an effective approach to address these problems, the slow- and controlled-release fertilizer (S-CRF) has been gradually used in agricultural production, and urea formaldehyde (UF) is the biodegradable polymer S-CRF chemical fertilizer first developed and commercialized. UF can be slowly degraded to gradually release nitrogen nutrient under the action of microorganisms. Compared with traditional fertilizers, UF slow-release nitrogen fertilizer has excellent cost-effectiveness, a high nitrogen utilization rate, and no topdressing required for one application. Therefore, it can achieve fertilizer conservation and efficiency improvement. Moreover, UF fertilizer can also promote the formation of soil aggregate structure, improve soil permeability, and enhance the root penetration ability of crops, thus becoming the most promising slow-release fertilizer (SRF).

Microelements are deeply involved in the growth, photosynthesis, and metabolism of plants, and thus are essential for the healthy growth of plants. For example, iron plays a role in electron transfer in photosynthesis, biological nitrogen fixation, and respiration; manganese can promote seed germination and seedling growth, participate in the photosynthesis of crops, and increase the yield of the wheat crops; boron plays a role in promoting the growth, development, and fructification of crops, improving the supply of oxygen to the roots, and increasing the yields of crops (such as oilseed rape and cotton); zinc and copper are involved in the enzyme synthesis in plants, and can enhance the cold and disease resistances; and rice, maize, and vegetables are sensitive to zinc deficiency. The demand of crops for microelements is small and can generally be satisfied directly from the soil. However, for some microelements, their effective contents in the soil are too low to meet the needs for crop growth, development, and fructification. Therefore, applying a fertilizer containing such microelements is necessary to achieve the goals of high yield, great quality, and high efficiency.

Amino acids are not only important for animals, but also play a significant role in plant growth, and are essential for plants. Specifically, the amino acids have the following effects on the plant: (1) providing basic components for protein synthesis; (2) providing nitrogen, carbon, and energy sources for plants, and promoting the photosynthesis and chlorophyll synthesis in crops; (3) providing nutrients for rhizosphere microorganisms (saprophytic bacteria); (4) passivating a variety of heavy metal elements, and reducing their toxic and side effects; (5) enhancing resistance to adverse conditions, such as resistance to low temperatures; and (6) chelating a variety of micro-elements for absorption and utilization by plants.

Reactive extrusion technology has become an emerging polymer processing technology in recent years, in which the polymerization process and the processing process are combined, that is, the chemical reaction and continuous production occur simultaneously in the processing machinery. The extruder is used as a reaction vessel, and the plasticization extrusion system, consisting of a screw and a barrel, is used as a continuous reactor. Various raw material components, such as monomers, initiators, polymers, and additives, are fed to the screw simultaneously or batch-wise through the same or different feeding ports in one or several stages. By means of the rotation of the screw, the processes of mixing, conveying, plasticization, reaction, and extrusion from the die are completed. The reactive extrusion technology has the following advantages:

suitable for continuous large-scale production; low investment and low cost; no or little consumption of toxic solvents; readily-available raw materials; wide choice of products; simplifying removing volatiles from polymers, granulation, and molding; high reaction efficiency; and homogeneous product performance. Therefore, reactive extrusion technology exhibits a promising application prospect.

Interpenetrating network technology is an emerging polymer modification approach, by which multiple monomers are physically or chemically cross-linked to form an interpenetrating polymer network (IPN). There are no covalent bonds between the interpenetrating networks, and each network holds relative independence, which can maintain its unique performance. Therefore, IPN can achieve comprehensive performances that other polymers cannot compare and has developed rapidly in the field of functional polymer materials. The IPN generally includes a semi-interpenetrating polymer network consisting of a cross-linked polymer and a linear polymer, and a fully interpenetrating polymer network consisting of two cross-linked polymers.

SUMMARY

An object of the present disclosure is to provide a microelement amino acid chelate-urea formaldehyde (UF) slow-release fertilizer and a method for preparing the same by reactive extrusion to arrive at an enhanced fertilizer conservation and efficiency improvement.

Technical solutions of the present disclosure are described as follows.

In a first aspect, this application provides a microelement amino acid chelate-urea formaldehyde (UF) slow-release fertilizer, comprising:
a biodegradable UF polymer; and
a chelate of a microelement and an amino acid;

wherein macromolecular chains of the biodegradable UF polymer interpenetrate in a cross-linked network structure of the chelate, so as to form a polymer composite with a semi-interpenetrating network structure.

In some embodiments, the amino acid is selected from the group consisting of glycine, aspartic acid, arginine, histidine, and a combination thereof.

In some embodiments, the microelement is selected from the group consisting of iron, copper, zinc, manganese, boron, and a combination thereof.

In some embodiments, a nutrient nitrogen content in the polymer composite is 25-40 wt. %.

In a second aspect, this application provides a method of preparing the aforementioned microelement amino acid chelate-UF slow-release fertilizer by reactive extrusion, comprising:

(S1) feeding formaldehyde and urea to a reactor to form a first reaction system; and adjusting a pH of the first reaction system followed by a reaction to obtain a hydroxymethylurea solution;

(S2) dissolving an amino acid in the hydroxymethylurea solution followed by addition of a microelement-containing compound to form a second reaction system; and adjusting a pH of the second reaction system;

(S3) sealing a die opening between a reaction unit and an extrusion unit of a reaction-extrusion integrated machinery; and feeding the second reaction system into a reaction extruder of the reaction unit of the reaction-extrusion integrated machinery;

(S4) turning on a screw of the reaction extruder to allow the second reaction system to undergo a reaction at a first preset temperature and a first preset rotation speed, and simultaneously starting a vacuumization-devolatilization device of the reaction extruder to remove water, so as to obtain a third reaction system;

(S5) opening the die opening between the reaction unit and the extrusion unit; turning on a twin-screw extruder of the extrusion unit; conveying, by the screw of the reaction extruder, the third reaction system to the twin-screw extruder; and extruding, by the twin-screw extruder, the third reaction system at a second preset temperature and a second preset rotation speed to obtain a strip-shaped extrudate; and (S6) drying the strip-shaped extrudate followed by granulation to obtain the microelement amino acid chelate-UF slow-release fertilizer in a form of a cylindrical granule.

In an embodiment, in step (S1), a molar ratio of the urea to the formaldehyde is 1-2:1; the first reaction system is adjusted to pH 7-9; and the reaction is performed at 30-60° C. for 0.5-3 h. In an embodiment, in step (S2), the amino acid is 5-40% by weight of hydroxymethylurea contained in the hydroxymethylurea solution; the microelement-containing compound is 1-17% by weight of the hydroxymethylurea contained in the hydroxymethylurea solution; and the second reaction system is adjusted to pH 4-7.

In an embodiment, in step (S2), the microelement-containing compound is selected from the group consisting of ferrous sulphate, copper sulphate, zinc sulphate, boric acid, manganese sulphate, and a combination thereof.

In an embodiment, in step (S4), the first preset temperature is 40-80° C.; the first preset rotation speed is 100-150 rpm; and the reaction is performed for 0.5-3 h.

In an embodiment, in step (S5), the second preset temperature is 40-80° C.; and the second preset rotation speed is 100-150 rpm.

Compared to the prior art, the present disclosure has the following beneficial effects.

(1) In addition to the nitrogen nutrient required for crop growth and development, the microelement amino acid chelate-UF slow-release fertilizer prepared in this application also contains amino acids and microelements such as iron, copper, and zinc, which can remedy the deficiency that the existing UF slow-release fertilizers only have a single nutrient, and provide rich and various nutrients for the plant growth.

(2) This application effectively combines amino acids with a UF slow-release nitrogen fertilizer, which can improve the utilization efficiency of the nitrogen from the UF and the introduced microelements (such as iron, copper, and zinc).

(3) In this application, the microelements are chelated with amino acids, preventing them from reacting with phosphate, sulfate, and organic matter in the soil. Therefore, compared to the traditional inorganic salt-based microelement fertilizers, the fertilizer provided herein has a much higher absorption and utilization efficiency.

(4) The reactive extrusion and granulation process for the preparation method provided herein has the following advantages: suitable for continuous large-scale production; low investment and low cost; no or little consumption of toxic solvents; simplifying the processes of removing volatiles from polymers and granulation; high reaction efficiency; and uniform product performance. Therefore, this application has promising application prospects.

BRIEF DESCRIPTION OF THE DRAWINGS

The accompanying drawings herein are incorporated into and form part of the specification, which illustrate some embodiments of the present disclosure and are used in conjunction with the specification to explain the principles of the present disclosure.

To illustrate the technical solutions in the embodiments of the present disclosure or in the prior art more clearly, the accompanying drawings required in the description of the embodiments or the prior art will be introduced briefly. Obviously, based on these drawings, other drawings may be obtained by one of ordinary skill in the art without paying for creative work.

DETAILED DESCRIPTION OF EMBODIMENTS

To enable a clearer understanding of the objects, features, and advantages of the present disclosure, the embodiments of the present disclosure will be further described below. It is to be noted that, the embodiments of the present disclosure and the features in the embodiments may be combined with each other without contradiction.

Figure 14:
FIG. 14 schematically shows a structure of a microelement amino acid chelate-UF slow-release fertilizer according to an embodiment of the present disclosure.

Referring to FIG. 14, a microelement amino acid chelate-urea formaldehyde (UF) slow-release fertilizer is provided, which includes a biodegradable UF polymer and a chelate of a microelement and an amino acid. The macromolecular chains of the UF biodegradable polymer are interspersed in the cross-linked network structure of the chelate, so as to form a polymer composite with a semi-interpenetrating network structure.

In some embodiments, the amino acid is selected from the group consisting of glycine, aspartic acid, arginine, histidine, and a combination thereof.

In some embodiments, the microelement is selected from the group consisting of iron, copper, zinc, manganese, boron, and a combination thereof, where a content of each microelement is 0.1-5 wt. % of the polymer composite.

In some embodiments, a nutrient nitrogen content in the polymer composite is 25-40 wt. %.

This application also provides a method for preparing the microelement amino acid chelate-UF slow-release fertilizer by reactive extrusion, which includes the following steps.

(1) Formaldehyde and urea are fed to a reactor in a molar ratio to form a first reaction system. The first reaction system is subjected to pH adjustment and reaction to obtain a hydroxymethylurea solution.

(2) An amino acid is added and dissolved in the hydroxymethylurea solution prepared in step (1), and then the reaction mixture is added with a microelement-containing compound to form a second reaction system, which is then subjected to pH adjustment.

(3) A die opening between a reaction unit and an extrusion unit of a reaction-extrusion integrated machinery is sealed. Then the second reaction system obtained in step (2) is fed into a reaction extruder of the reaction unit of the reaction-extrusion integrated machinery.

(4) A screw of the reaction extruder is turned on, and the second reaction system is subjected to reaction at a first preset temperature and a first preset rotation speed, and simultaneously a vacuumization-devolatilization device of the reaction extruder is started to remove water to obtain a third reaction system.

(5) The die opening between the reaction unit and the extrusion unit is opened, and a twin-screw extruder of the extrusion unit is turned on, then the third reaction system obtained in step (4) is conveyed by the screw of the reaction extruder to the twin-screw extruder, and subjected to extrusion at a second preset temperature and a second rotation speed to obtain a strip-shaped extrudate.

(6) The strip-shaped extrudate obtained in step (5) is dried and granulated to obtain the microelement amino acid chelate-UF slow-release fertilizer in a form of a cylindrical granule.

The reaction mechanism for the preparation of the microelement amino acid chelate-UF slow-release fertilizer by reactive extrusion provided herein is partially shown in the following reaction schemes:

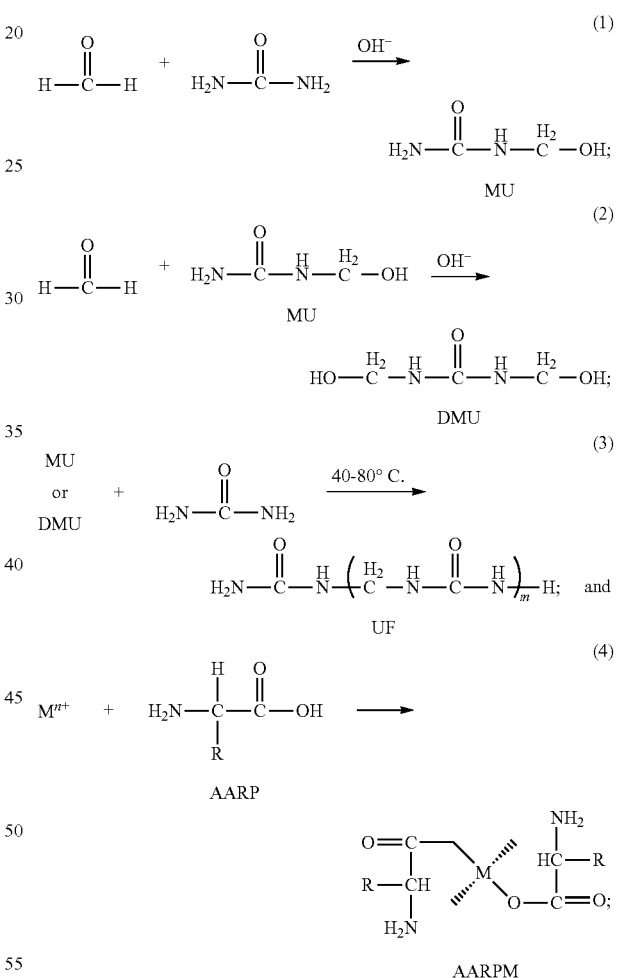

where M represents a microelement selected from the group consisting of iron, copper, zinc, manganese, boron, and a combination thereof; AARP represents an amino acid selected from the group consisting of glycine, aspartic acid, arginine, histidine, and a combination thereof; and AARPM represents a chelate of the amino acid and the microelement.

The reaction-extrusion integrated machinery described herein includes a reaction unit and an extrusion unit. The reaction extruder of the reaction unit and the twin-screw extruder of the extrusion unit are both well-known in the art, where the discharge die opening of the reaction extruder is communicated with the feed die opening of the twin-screw extruder.

In an embodiment, in step (1), the molar ratio of urea to formaldehyde is 1-2:1, and the first reaction system is adjusted to pH 7-9; and the reaction is performed at 30-60° C. for 0.5-3 h.

In an embodiment, in step (2), the amino acid is 5-40% by weight of the hydroxymethylurea contained in the hydroxymethylurea solution; the microelement-containing compound is 1-17% by weight of the hydroxymethylurea contained in the hydroxymethylurea solution; the second reaction system is adjusted to pH 4-7; and a weight of the hydroxymethylurea contained in the hydroxymethylurea solution is determined by the amount of formaldehyde and urea added in step (1).

In an embodiment, in step (2), the microelement-containing compound is selected from the group consisting of ferrous sulphate, copper sulphate, zinc sulphate, boric acid, manganese sulphate, and a combination thereof.

In another embodiment, in step (4), the first preset temperature is 40-80° C.; the first preset rotation speed is 100-150 rpm; and the reaction is performed for 0.5-3 h.

In another embodiment, in step (5), the second preset temperature is 40-80° C.; and the second preset rotation speed is 100-150 rpm.

In another embodiment, in step (6), the strip-shaped extrudate is dried at 60-80° C.

The performances of the microelement amino acid chelate-UF slow-release fertilizer obtained in this application are tested and characterized as shown below.
(1) The microelement amino acid chelate-UF slow-release fertilizer cylindrical granules are subjected to grinding, crushing, and sieving with a 0.25 μm mesh to obtain their sample powders for testing. Then each sample powder is added with a small amount of dried KBr powder, followed by tableting and infrared (IR) testing at room temperature by using a Nicolet IS50 IR spectrometer with a scan range of 500-4000 cm$^{-1}$. X-ray diffractometry (XRD) analysis is carried out by using an X-ray diffractometer (HAOYUAN DX-2700B) with a scan range of 5-80°. The thermal stability of the sample is measured by using a thermogravimetric analyzer (TA Q50) under a nitrogen atmosphere with a temperature range of 30-800° C., a heating rate of 10° C./min, and a nitrogen flow rate of 40 mL/min. (2) A scanning electron microscope (SEM, Hitachi 132 SU8010) is used to observe the morphology of the fracture cross-section of the microelement amino acid chelate-UF slow-release fertilizer cylindrical granule.
(3) A compression strength test for the microelement amino acid chelate-UF slow-release fertilizer is carried out by using a universal testing machine MTS CMT5105. Specifically, the microelement amino acid chelate-UF slow-release fertilizer cylindrical granule is placed on the testing machine and compressed in the longitudinal direction at a pressure of 20,000 kgf and a compression rate of 5 mm/min until 40% of the maximum deformation is reached, completing the test.
(4) The slow-release performance of nutrient nitrogen of the microelement amino acid chelate-UF slow-release fertilizer is characterized by a release test in still water. Specifically, 5.00 g of microelement amino acid chelate-UF slow-release fertilizer cylindrical granules are weighed, packed, and sealed in a 100-mesh nylon bag, placed in a bottle containing 100 mL deionized water, and incubated in a 25° C. water bath. Samples are taken at 1, 3, 5, 7, 10, 14, 28, 42, 56, and 70 days, respectively. When sampling, the nylon bag is placed on the opening of the bottle with forceps to drain off water. After there is no droplet, the nylon mesh bag is placed in a new bottle containing 100 mL of deionized water to continue incubation. The original bottle is turned upside down to ensure the consistency of the concentration of solution inside. Then 20 mL of the solution is taken to determine the nitrogen content by using a sulphuric acid-hydrogen peroxide digestion method and Kjeldahl nitrogen determination method and the iron content by using an o-Phenanthroline colorimetric method and calculating the cumulative release rate of nutrients.

The technical solutions of the present disclosure are described in detail below with reference to specific examples.

Example 1

Provided herein was a method for preparing a Fe glycine chelate-UF slow-release fertilizer by a reactive extrusion process, which included the following steps.
(1) Formaldehyde and urea were fed to a reactor in a molar ratio of 1.3:1, and the reaction mixture was adjusted to pH 8 and reacted at 40° C. for 1.5 h to obtain a hydroxymethylurea solution.
(2) Glycine was added and dissolved in the hydroxymethylurea solution, where the glycine was 20% by weight of the hydroxymethylurea contained in the hydroxymethylurea solution. Then the reaction mixture was added with ferrous sulfate, and adjusted to pH 7, where the ferrous sulfate was 7% by weight of the hydroxymethylurea contained in the hydroxymethylurea solution.
(3) A die opening between a reaction unit and an extrusion unit of a reaction-extrusion integrated machine was sealed. Then the reaction mixture obtained in step (2) was pumped into a reaction extruder of the reaction unit.
(4) A screw of the reaction extruder was turned on, and the reaction mixture was subjected to reaction at 40° C. and 100 rpm for 1.5 h, and in the meanwhile, a vacuumization-devolatilization device of the reaction extruder was started to remove water from the reaction mixture until the reaction mixture was viscous.
(5) The die opening between the reaction unit and the extrusion unit was opened, and a twin-screw extruder of the extrusion unit was turned on. The reaction mixture obtained in step (4) was conveyed by the screw of the reaction extruder to the twin-screw extruder and subjected to extrusion at 80° C. and 150 rpm to obtain a strip-shaped extrudate.
(6) The strip-shaped extrudate obtained in step (5) was dried at 80° C. and granulated to obtain the Fe glycine chelate-UF slow-release fertilizer cylindrical granules with a good granular shape.

The prepared Fe glycine chelate-UF slow-release fertilizer cylindrical granules had an N content of 32.3 wt. %, a Fe content of 1.94 wt. %, an initial N release rate of 14.7% and a Fe release rate of 17.1%.

Example 2

Provided herein was a method for preparing a Fe glycine chelate-UF slow-release fertilizer by a reactive extrusion process, which included the following steps.

(1) Formaldehyde and urea were fed to a reactor in a molar ratio of 1.5:1, and the reaction mixture was adjusted to pH 7 and reacted at 30° C. for 3 h to obtain a hydroxymethylurea solution.

(2) Glycine was added and dissolved in the hydroxymethylurea solution, where the glycine was 20% by weight of the hydroxymethylurea contained in the hydroxymethylurea solution. Then the reaction mixture was added with ferrous sulfate and adjusted to pH 5, where the ferrous sulfate was 7% by weight of the hydroxymethylurea contained in the hydroxymethylurea solution.

(3) A die opening between a reaction unit and an extrusion unit of a reaction-extrusion integrated machine was sealed. Then the reaction mixture obtained in step (2) was pumped into a reaction extruder of the reaction unit.

(4) A screw of the reaction extruder was turned on, and the reaction mixture was subjected to reaction at 80° C. and 150 rpm for 0.5 h, and in the meanwhile, a vacuumization-devolatilization device of the reaction extruder was started to remove water from the reaction mixture until the reaction mixture was viscous.

(5) The die opening between the reaction unit and the extrusion unit was opened, and a twin-screw extruder of the extrusion unit was turned on. The reaction mixture obtained in step (4) was conveyed by the screw of the reaction extruder to the twin-screw extruder and subjected to extrusion at 80° C. and 150 rpm to obtain a strip-shaped extrudate.

(6) The strip-shaped extrudate obtained in step (5) was dried at a preset temperature and granulated to obtain the Fe glycine chelate-UF slow-release fertilizer cylindrical granules with a good granular shape.

The prepared Fe glycine chelate-UF slow-release fertilizer cylindrical granules had an N content of 33.6 wt. % and a Fe content of 1.94 wt. %, an initial N release rate of 29.9% and a Fe release rate of 25.5%.

Example 3

Provided herein was a method for preparing a Fe glycine chelate-UF slow-release fertilizer by a reactive extrusion process, which included the following steps.

(1) Formaldehyde and urea were fed to a reactor in a molar ratio of 1.7:1, and the reaction mixture was adjusted to pH 9 and reacted at 60° C. for 2 h to obtain a hydroxymethylurea solution.

(2) Glycine was added and dissolved in the hydroxymethylurea solution, where the glycine was 20% by weight of the hydroxymethylurea contained in the hydroxymethylurea solution. Then the reaction mixture was added with ferrous sulfate and adjusted to pH 4, where the ferrous sulfate was 7% by weight of the hydroxymethylurea contained in the hydroxymethylurea solution.

(3) A die opening between a reaction unit and an extrusion unit of a reaction-extrusion integrated machine was sealed. Then the reaction mixture obtained in step (2) was pumped into a reaction extruder of the reaction unit.

(4) A screw of the reaction extruder was turned on, and the reaction mixture was subjected to reaction at 70° C. and 100 rpm for 3.0 h, and in the meanwhile, a vacuumization-devolatilization device of the reaction extruder was started to remove the water from the reaction mixture until the reaction mixture was viscous.

(5) The die opening between the reaction unit and the extrusion unit was opened, and a twin-screw extruder of the extrusion unit was turned on. The reaction mixture obtained in step (4) was conveyed by the screw of the reaction extruder to the twin-screw extruder and subjected to extrusion at 70° C. and 100 rpm to obtain a strip-shaped extrudate.

(6) The strip-shaped extrudate obtained in step (5) was dried at 80° C. and granulated to obtain the Fe glycine chelate-UF slow-release fertilizer cylindrical granules with a good granular shape.

The prepared Fe glycine chelate-UF slow-release fertilizer cylindrical granules had an N content of 34.7 wt. % and a Fe content of 1.94 wt. %, an initial N release rate of 45.6% and a Fe release rate of 36%.

Example 4

Provided herein was a method for preparing a microelement aspartic acid chelate-UF slow-release fertilizer by a reactive extrusion process, which included the following steps.

(1) Formaldehyde and urea were fed to a reactor in a molar ratio of 1.3:1, and the reaction mixture was adjusted to pH 8 and reacted at 60° C. for 0.5 h to obtain a hydroxymethylurea solution.

(2) Aspartic acid was added and dissolved in the hydroxymethylurea solution, where the aspartic acid was 20% by weight of the hydroxymethylurea contained in the hydroxymethylurea solution. Then the reaction mixture was added with a mixture consisting of ferrous sulfate, copper sulfate, zinc sulfate, boric acid, and manganese sulfate in a weight ratio of 1:1:1:1:1 and adjusted to pH 5, where the mixture was 10% by weight of the hydroxymethylurea contained in the hydroxymethylurea solution.

(3) A die opening between a reaction unit and an extrusion unit of a reaction-extrusion integrated machine was sealed. Then the reaction mixture obtained in step (2) was pumped into a reaction extruder of the reaction unit.

(4) A screw of the reaction extruder was turned on, and the reaction mixture was subjected to reaction at 40° C. and 100 rpm for 1.5 h, and in the meanwhile, a vacuumization-devolatilization device of the reaction extruder was started to remove water from the reaction mixture until the reaction mixture was viscous.

(5) The die opening between the reaction unit and the extrusion unit was opened, and a twin-screw extruder of the extrusion unit was turned on. The reaction mixture obtained in step (4) was conveyed by the screw of the reaction extruder to the twin-screw extruder and subjected to extrusion at 40° C. and 100 rpm to obtain a strip-shaped extrudate.

(6) The strip-shaped extrudate obtained in step (5) was dried at 60° C. and granulated to obtain the microelement aspartic acid chelate-UF slow-release fertilizer cylindrical granules with a good granular shape.

The prepared microelement aspartic acid chelate-UF slow-release fertilizer cylindrical granules had an N content of 32.6 wt. %, a Fe content of 0.54 wt. %, a Cu content of 0.58 wt. %, a Zn content of 0.59 wt. %, a B content of 0.2 wt. %, an Mn content of 0.53 wt. %, and an initial N release rate of 18%.

Example 5

Provided herein was a method for preparing a B arginine chelate-UF slow-release fertilizer by a reactive extrusion process, which included the following steps.

(1) Formaldehyde and urea were fed to a reactor in a molar ratio of 1:1, and the reaction mixture was adjusted to pH 8 and reacted at 40° C. for 1.5 h to obtain a hydroxymethylurea solution.
(2) Arginine was added and dissolved in the hydroxymethylurea solution, where the arginine was 40% by weight of the hydroxymethylurea contained in the hydroxymethylurea solution. Then the reaction mixture was added with boric acid and adjusted to pH 6, where the boric acid was 5.6% by weight of the hydroxymethylurea contained in the hydroxymethylurea solution.
(3) A die opening between a reaction unit and an extrusion unit of a reaction-extrusion integrated machine was sealed. Then the reaction mixture obtained in step (2) was pumped into a reaction extruder of the reaction unit.
(4) A screw of the reaction extruder was turned on, and the reaction mixture was subjected to reaction at 40° C. and 100 rpm for 1.5 h, and in the meanwhile, a vacuumization-devolatilization device of the reaction extruder was started to remove water from the reaction mixture until the reaction mixture was viscous.
(5) The die opening between the reaction unit and the extrusion unit was opened, and a twin-screw extruder of the extrusion unit was turned on. The reaction mixture obtained in step (4) was conveyed by the screw of the reaction extruder to the twin-screw extruder and subjected to extrusion at 40° C. and 100 rpm to obtain a strip-shaped extrudate.
(6) The strip-shaped extrudate obtained in step (5) was dried at 60° C. and granulated to obtain the B arginine chelate-UF slow-release fertilizer cylindrical granules with a good granular shape.

The prepared B arginine chelate-UF slow-release fertilizer cylindrical granules had an N content of 20.1 wt. %, a B content of 0.5 wt. %, and an initial N release rate of 21%.

Example 6

Provided herein was a method for preparing a Zn histidine chelate-UF slow-release fertilizer by a reactive extrusion process, which included the following steps.
(1) Formaldehyde and urea were fed to a reactor in a molar ratio of 2:1, and the reaction mixture was adjusted to pH 8 and reacted at 40° C. for 1.5 h to obtain a hydroxymethylurea solution.
(2) Histidine was added and dissolved in the hydroxymethylurea solution, where the histidine was 40% by weight of the hydroxymethylurea contained in the hydroxymethylurea solution. Then the reaction mixture was added with zinc sulfate and adjusted to pH 7, where the zinc sulfate was 1.84% by weight of the hydroxymethylurea contained in the hydroxymethylurea solution.
(3) A die opening between a reaction unit and an extrusion unit of a reaction-extrusion integrated machine was sealed. Then the reaction mixture obtained in step (2) was pumped into a reaction extruder of the reaction unit.
(4) A screw of the reaction extruder was turned on, and the reaction mixture was subjected to reaction at 40° C. and 100 rpm for 1.5 h, and in the meanwhile, a vacuumization-devolatilization device of the reaction extruder was started to remove the water from the first reaction mixture until the reaction mixture was viscous.
(5) The die opening between the reaction unit and the extrusion unit was opened, and a twin-screw extruder of the extrusion unit was turned on. The reaction mixture obtained in step (4) was conveyed by the screw of the reaction extruder to the twin-screw extruder and subjected to extrusion at 40° C. and 100 rpm to obtain a strip-shaped extrudate.
(6) The strip-shaped extrudate obtained in step (5) was dried at 80° C. and granulated to obtain the Zn histidine chelate-UF slow-release fertilizer cylindrical granules with a good granular shape.

The prepared Zn histidine chelate-UF slow-release fertilizer cylindrical granules had an N content of 39.7 wt. %, a Zn content of 0.5 wt. %, and an initial N release rate of 49%.

Comparative Example 1

Provided herein was a method for preparing a UF slow-release fertilizer by a reactive extrusion process, which included the following steps.
(1) Formaldehyde and urea were fed to a reactor in a molar ratio of 1.3:1, and the reaction mixture was adjusted to pH 8 and reacted at 40° C. for 1.5 h to obtain a hydroxymethylurea solution.
(2) A die opening between a reaction unit and an extrusion unit of a reaction-extrusion integrated machine was sealed. Then the hydroxymethylurea solution obtained in step (1) was pumped into a reaction extruder of the reaction unit.
(3) A screw of the reaction extruder was turned on, and the hydroxymethylurea solution was subjected to reaction at 40° C. and 100 rpm for 1.5 h, and in the meanwhile, a vacuumization-devolatilization device of the reaction extruder was started to remove water from the hydroxymethylurea solution until the reaction mixture was viscous.
(4) The die opening between the reaction unit and the extrusion unit was opened, and a twin-screw extruder of the extrusion unit was turned on. The reaction mixture obtained in step (3) was conveyed by the screw of the reaction extruder to the twin-screw extruder and subjected to extrusion at 40° C. and 100 rpm to obtain a strip-shaped extrudate.
(5) The strip-shaped extrudate obtained in step (4) was dried at 80° C. and granulated to obtain UF slow-release fertilizer cylindrical granules with a good granular shape.

The prepared UF slow-release fertilizer cylindrical granules had an N content of 36.4 wt. % and an initial N release rate of 26.8%.

Comparative Example 2

Provided herein was a method for preparing a glycine-UF slow-release fertilizer by a reactive extrusion process, which included the following steps.
(1) Formaldehyde and urea were fed to a reactor in a molar ratio of 1.3:1, and the reaction mixture was adjusted to pH 8 and reacted at 40° C. for 1.5 h to obtain a hydroxymethylurea solution.
(2) Glycine was added and dissolved in the hydroxymethylurea solution, where the glycine was 20% by weight of the hydroxymethylurea contained in the hydroxymethylurea solution. Then the reaction mixture was adjusted to pH 7.
(3) A die opening between a reaction unit and an extrusion unit of a reaction-extrusion integrated machine was sealed. Then the reaction mixture obtained in step (2) was pumped into a reaction extruder of the reaction unit.

(4) A screw of the reaction extruder was turned on, and the reaction mixture was subjected to reaction at 40° C. and 100 rpm for 1.5 h, and in the meanwhile, a vacuumization-devolatilization device of the reaction extruder was started to remove water from the reaction mixture until the reaction mixture was viscous.

(5) The die opening between the reaction unit and the extrusion unit was opened, and a twin-screw extruder of the extrusion unit was turned on. The reaction mixture obtained in step (4) was conveyed by the screw of the reaction extruder to the twin-screw extruder and subjected to extrusion at 40° C. and 100 rpm to obtain a strip-shaped extrudate.

(6) The strip-shaped extrudate obtained in step (5) was dried at 80° C. and granulated to obtain the glycine UF slow-release fertilizer cylindrical granules with a good granular shape.

The prepared glycine UF slow-release fertilizer cylindrical granules had an N content of 33 wt. % and an initial N release rate of 29.3%.

The performance testing and characterization results of slow-release fertilizers prepared in the above examples are shown below.

FIGS. 1-4 showed the Fourier transform infrared (FT-IR) spectra of Fe glycine chelate-UF slow-release fertilizer (denoted as AARPFe-UF) prepared in Example 1, UF slow-release fertilizer (denoted as UF) prepared in Comparative Example 1, glycine-UF slow-release fertilizer (denoted as AARP-UF) prepared in Comparative Example 2, and glycine (denoted as AARP). The characteristic absorption peaks at 3043 $cm^{-1}$ and 3145 $cm^{-1}$ belonged to AARP, and the characteristic absorption peak at 3327 $cm^{-1}$ of UF was derived from the N—H stretching vibration of its secondary amide. The absorption peaks at 3327 $cm^{-1}$ and 1550 $cm^{-1}$ were attributed to the —CONH— group. The above-mentioned characteristic peaks existed in the spectra of both AARP-UF and AARPFe-UF, indicating that AARP (or AARP-UF) was successfully combined with UF. As the bonding and interaction to form the chelate were coordinate bonds, no new functional groups were formed, so no new characteristic peaks appeared in the IR spectrum of AARPFe-UF compared with that of AARP-UF. However, the absorption peak at 3327 $cm^{-1}$ assigned to UF was blue-shifted in the IR spectra both of AARP-UF and AARPFe-UF, and the blue-shift was greater in the IR spectrum of AARPFe-UF. In addition, in the IR spectra of AARP-UF and AARPFe-UF, the characteristic peak at 1546 $cm^{-1}$ assigned to —C═O in UF was also blue-shifted, and the degree of blue-shift was more significant in AARPFe-UF. The absorption peaks at 3043 $cm^{-1}$ and 3145 $cm^{-1}$ of AARP were shifted in the IR spectra of both AARP-UF and AARPFe-UF, and a larger shift existed in the IR spectrum of AARPFe-UF. The shift of the above characteristic peaks in the IR spectrum of AARP-UF was due to the hydrogen bonding interaction between AARP and UF, while the more significant shift in the IR spectrum of AARPFe-UF was due to the formation of an AARPFe chelate by Fe and AARP and the stronger interaction between the chelate and UF.

FIGS. 5-8 showed the X-ray diffraction (XRD) patterns of AARPFe-UF prepared in Example 1, UF prepared in Comparative Example 1, AARP-UF prepared in Comparative Example 2, AARP, and Fe. According to FIGS. 5-8, the crystallinity of UF, AARP-UF, and AARPFe-UF was calculated to be 67.04%, 59.28%, and 57.46%, respectively, in decreasing order. The diffraction peaks for UF (2θ=22.5°, 25.0°) and AARP (2θ=32.6°) simultaneously appeared in the XRD patterns of both AARP-UF and AARPFe-UF, indicating a successful combination of UF and AARP in AARP-UF and AARPFe-UF. However, compared with UF, the intensities of UF diffraction peaks in both AARP-UF and AARPFe-UF were all significantly reduced, and a new diffraction peak was generated at 2θ=30.5° that referred to a new crystal form. In addition, the addition of Fe sharpened the diffraction peak of AARP and the new diffraction peak (2θ=30.5°) and lowered the intensity of the diffraction peak of UF, indicating that AARP and Fe ions were not simply physically mixed, but existing some interactions. As the chelating reaction of amino acid and metal ions by coordination happened very easily, indicating that AARP and Fe ions formed the AARPFe chelate. Moreover, in the XRD pattern of AARPFe-UF, the diffraction peaks at 22.336°, 32.511°, and 41.166°, respectively, corresponding to the (110), (200), and (211) crystal planes were all stronger and sharper compared with the XRD pattern of Fe, further indicating the formation of the AARPFe chelate.

Figure 1:
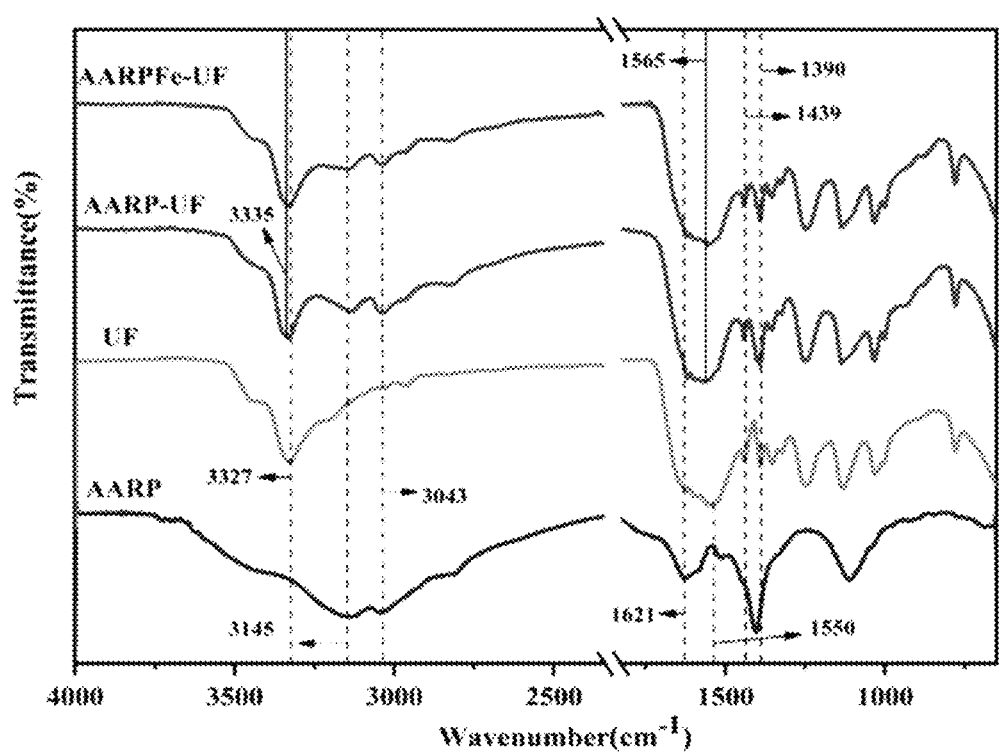
FIG. 1 shows the Fourier transform infrared (FT-IR) spectra of Fe glycine chelate-urea formaldehyde (UF) slow-release fertilizer (denoted as AARPFe-UF) prepared in Example 1, UF slow-release fertilizer (denoted as UF) prepared in Comparative Example 1, glycine-UF slow-release fertilizer (denoted as AARP-UF) prepared in Comparative Example 2, and glycine (denoted as AARP)
Figure 2:
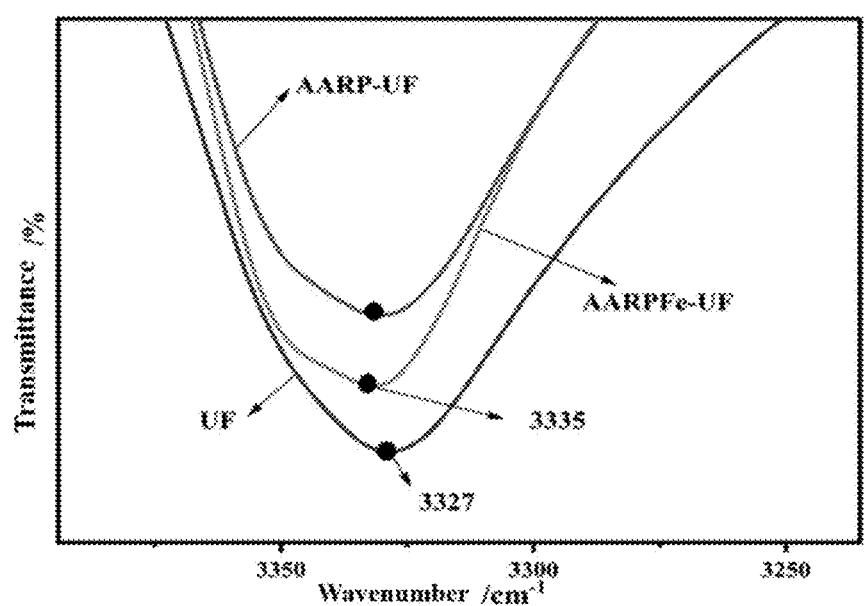
FIG. 2 is a first partially enlarged view of FIG. 1.
Figure 3:
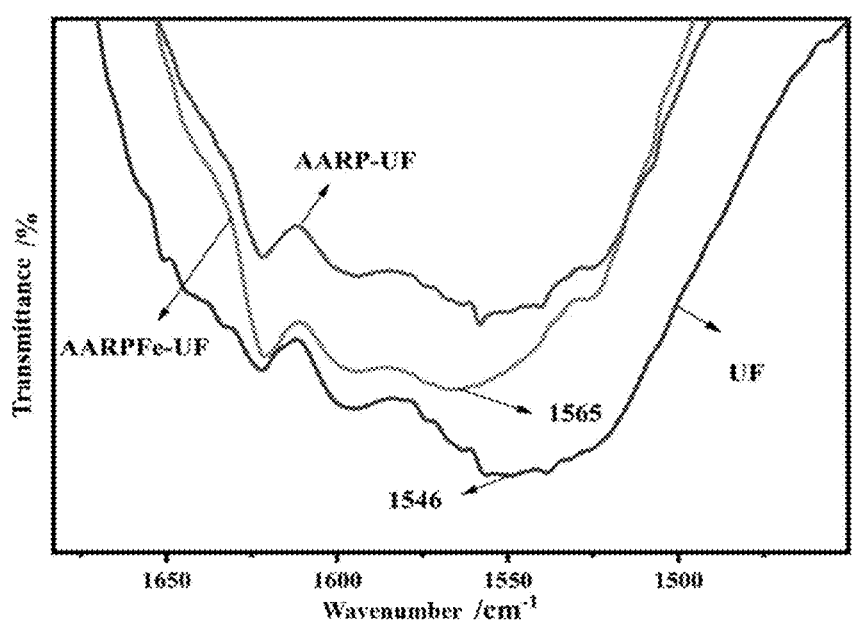
FIG. 3 is a second partially enlarged view of FIG. 1.
Figure 4:
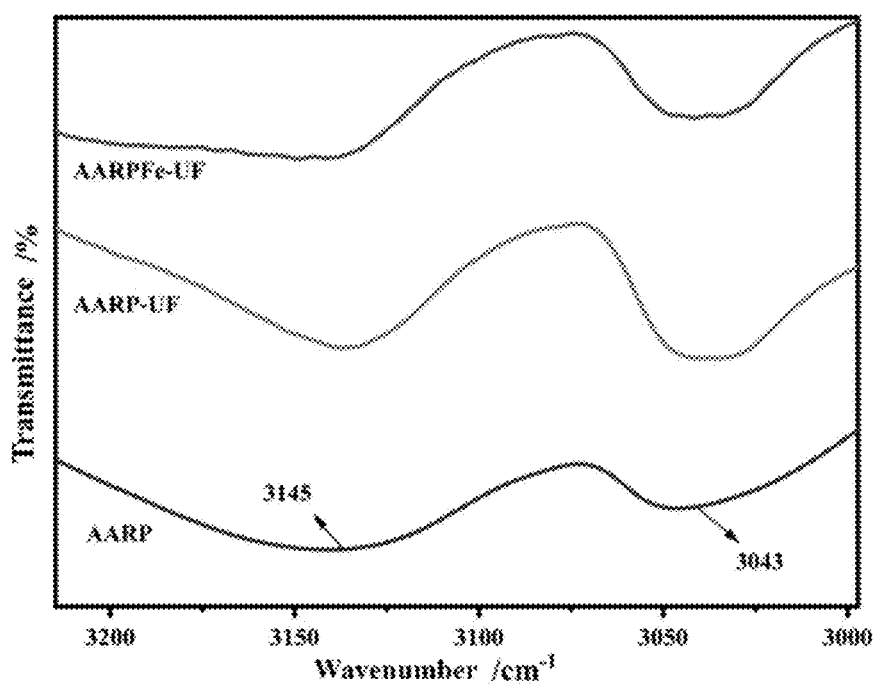
FIG. 4 is a third partially enlarged view of FIG. 1.
Figure 5:
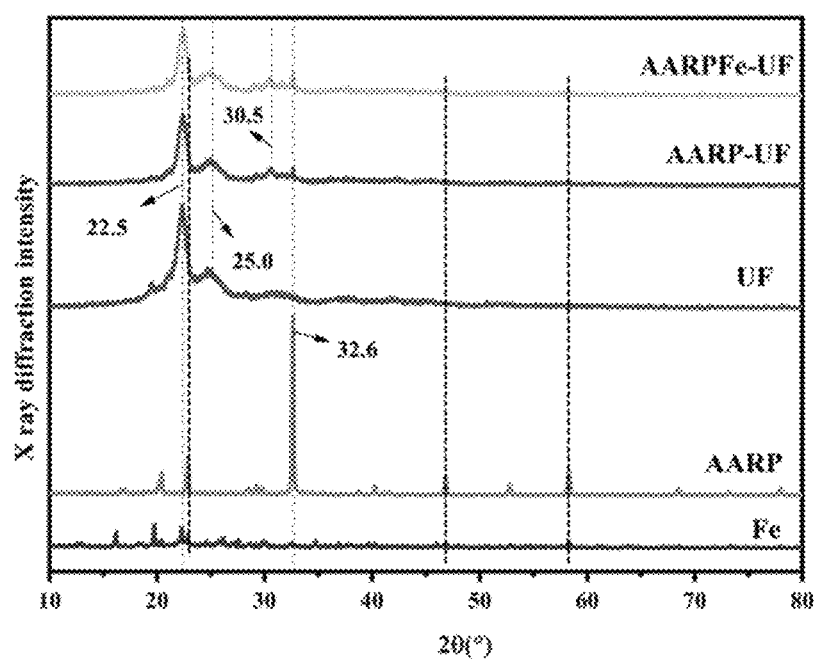
FIG. 5 shows the X-ray diffraction (XRD) patterns of the AARPFe-UF prepared in Example 1, the UF prepared in Comparative Example 1, the AARP-UF prepared in Comparative Example 2, AARP, and Fe.
Figure 6:
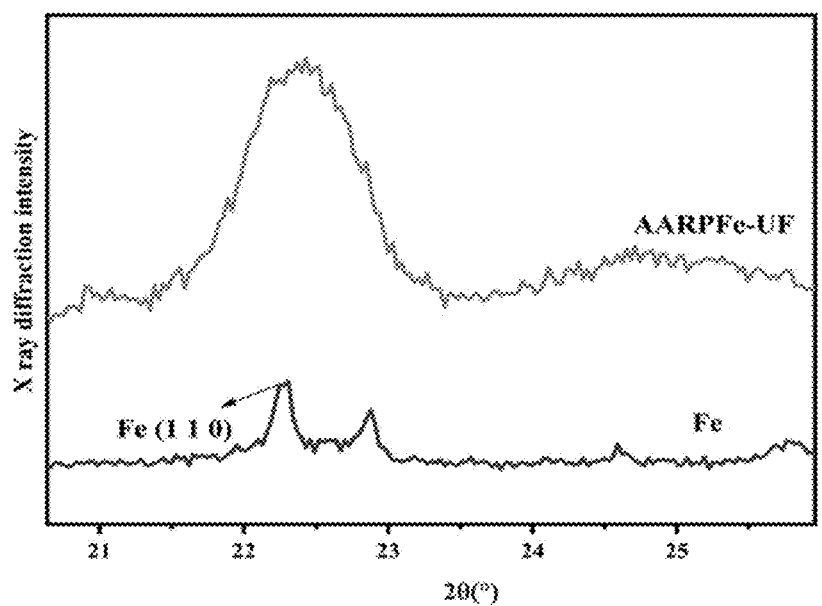
FIG. 6 is a first partially enlarged view of FIG. 5.
Figure 7:
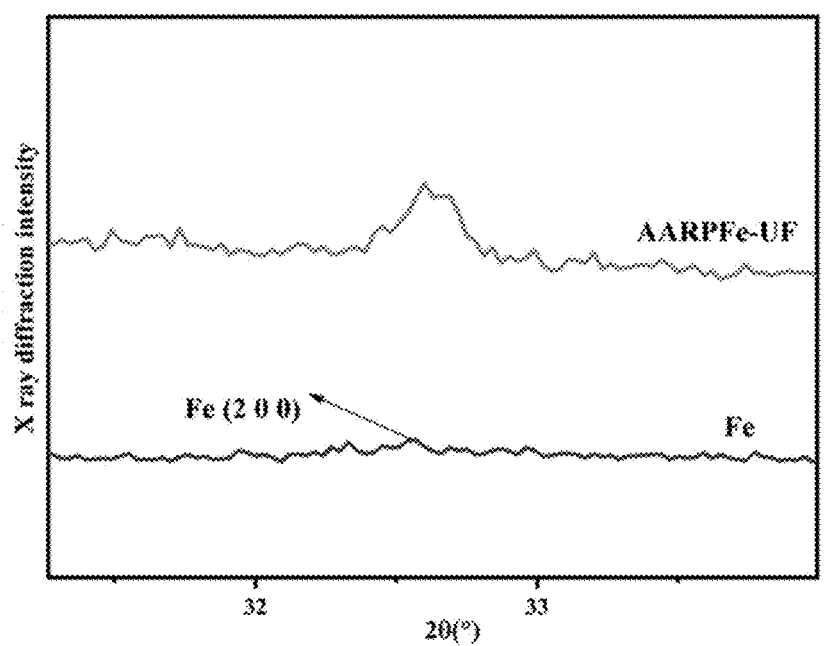
FIG. 7 is a second partially enlarged view of FIG. 5.
Figure 8:
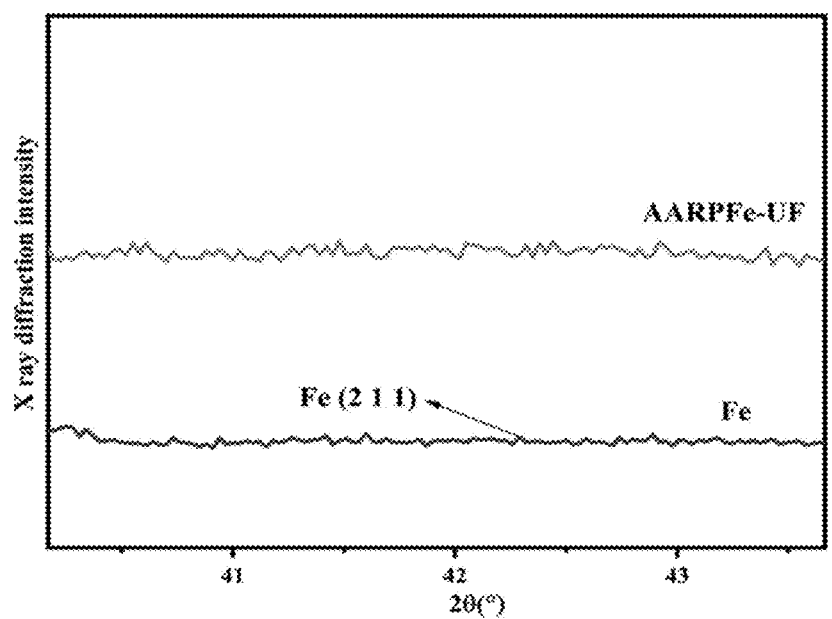
FIG. 8 is a third partially enlarged view of FIG. 5.
Figure 9:
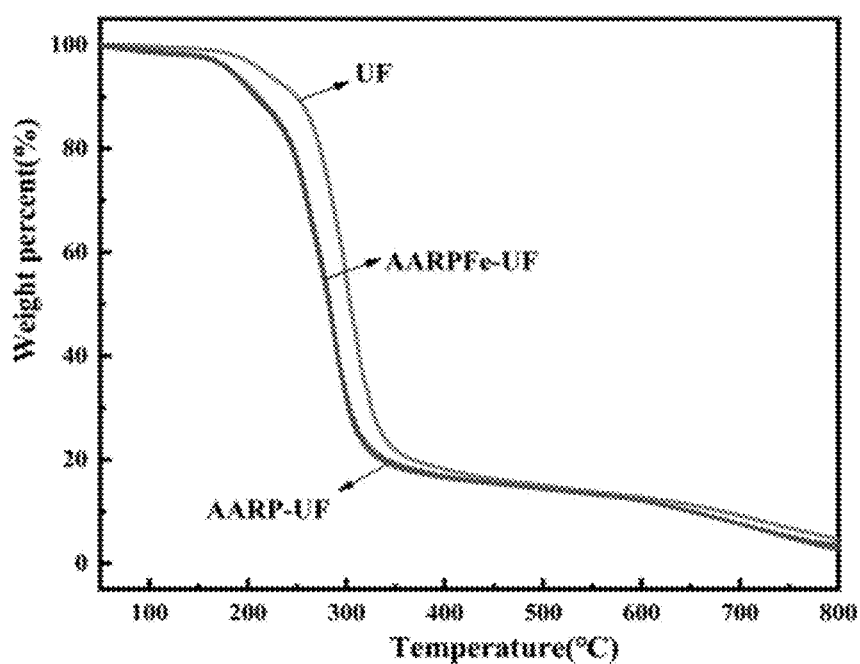
FIG. 9 shows the thermogravimetry (TG) curves of the AARPFe-UF prepared in Example 1, the UF prepared in Comparative Example 1, and the AARP-UF prepared in Comparative Example 2.
Figure 10:
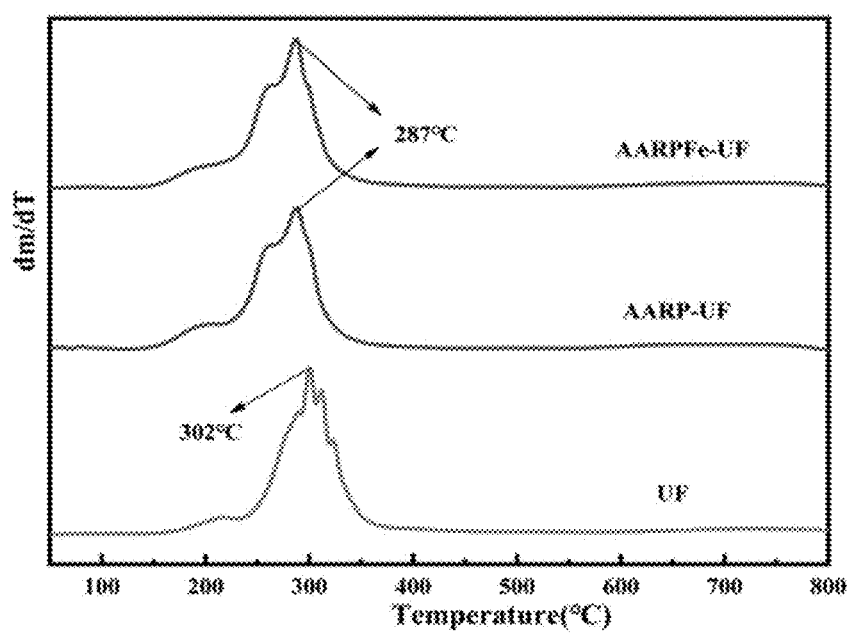
FIG. 10 shows the derivative thermogravimetry (DTG) curves of the AARPFe-UF prepared in Example 1, the UF prepared in Comparative Example 1, and the AARP-UF prepared in Comparative Example 2.

As shown in FIGS. 9-10, UF started to pyrolyze from 172° C. The thermal stability curves of AARP-UF and AARPFe-UF overlapped, in which the pyrolysis started from 149° C., indicating that the addition of microelement iron had essentially no effect on the thermal stability of the fertilizers. At the same temperature, the mass loss rate of UF was less than that of the urea-formaldehyde modified fertilizers (i.e., AARP-UF and AARPFe-UF), indicating that the thermal stability of AARP-UF and AARPFe-UF lower than that of UF in some extent. This was because the UF molecular chains were arranged regularly due to the strong hydrogen bonding interactions between the functional groups such as amide groups and hydroxyl groups in pure UF molecules. However, when AARP and AARPFe were introduced into UF, they broke the hydrogen bonding interactions between the UF molecular chains and formed new hydrogen bonding interactions with UF, resulting in a significant increase in the disorderly arrangement of the UF molecular chains in AARP-UF and AARPFe-UF, which rendered AARP-UF and AARPFe-UF to be more easily decomposed at lower temperatures. Furthermore, FIG. 6 also showed that the maximum pyrolysis temperature of AARPFe-UF was slightly lower than that of AARPFe but significantly lower than that of UF. This was because an interpenetrating network structure was formed between AARPFe and UF, further breaking the crystalline structure of UF molecules and thus reducing the thermal stability.

Figure 11:
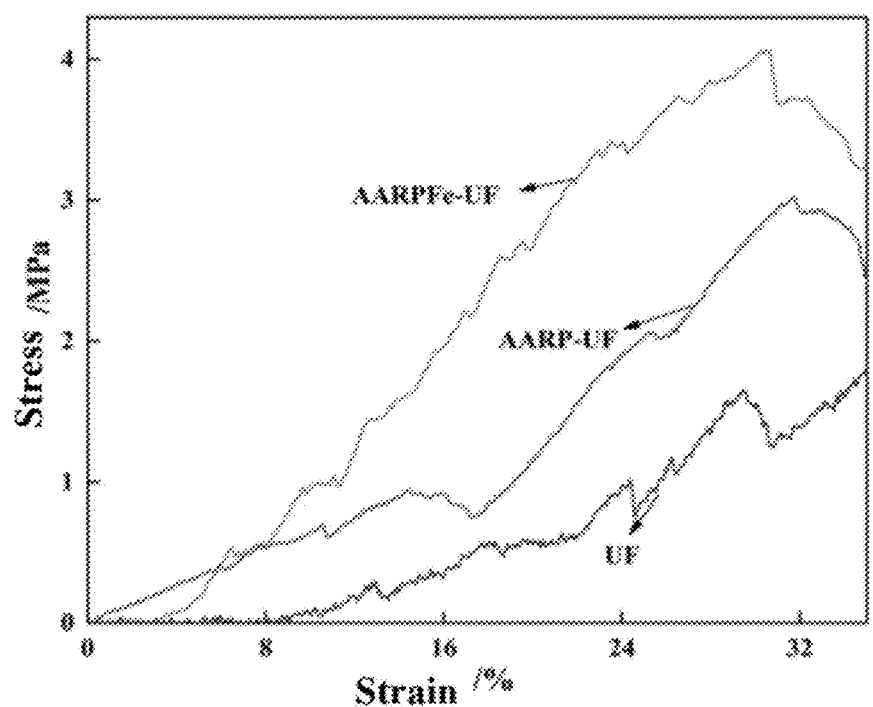
FIG. 11 shows the compression strength test curves of the AARPFe-UF prepared in Example 1, the UF prepared in Comparative Example 1, and the AARP-UF prepared in Comparative Example 2.

Compression strength was an important indicator to characterize the mechanical properties of a fertilizer. As shown in FIG. 11, the compression strength of all three fertilizers was at a low level in the initial stage due to the pores and gullies generated by the volatilization of water and small molecule monomers contained in the fertilizers during the high-temperature drying. During compression, these pores were gradually filled and the compression strength increased rapidly, but the increase in UF was much smaller than that of AARP-UF and AARPFe-UF. It indicated that both AARP and AARPFe were uniformly dispersed in the matrix UF and were able to withstand and disperse the stresses applied to the matrix UF. Furthermore, due to the strong hydrogen bonding between AARP, AARPFe, and UF, AARP-UF and AARPFe-UF were able to absorb compression work during the compression process and thus had a higher compression strength compared with UF. Notably, for AARPFe-UF, the chelation of AARPFe rendered a firm combination with the amino acids, and a semi-interpenetrating network structure was formed between AARPFe and UF, rendering AARPFe-UF a higher compression strength than AARP-UF, thereby facilitating the subsequent storage, transport, and application.

Figure 12:
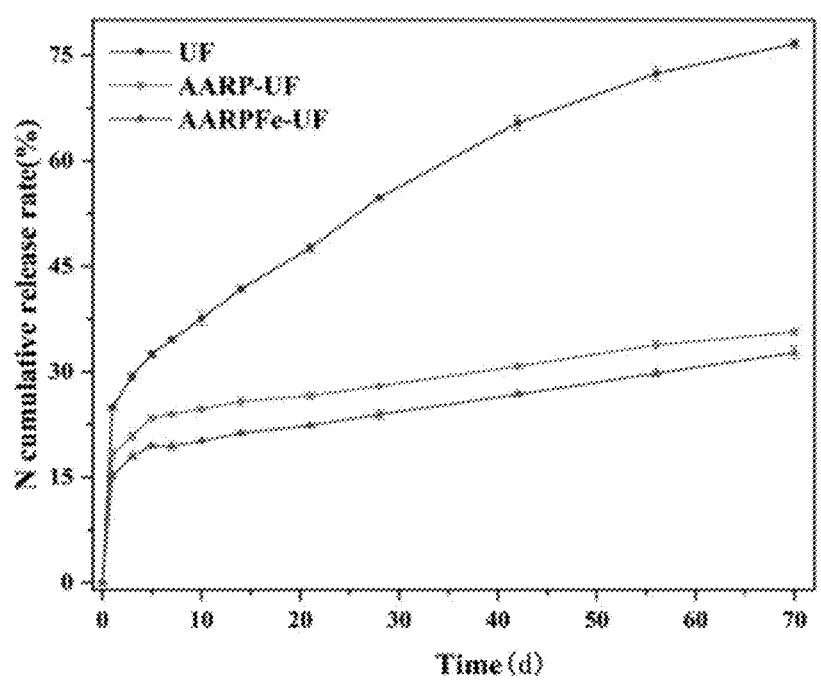
FIG. 12 shows the nitrogen cumulative release rate curves of the AARPFe-UF prepared in Example 1, the UF prepared in Comparative Example 1, and the AARP-UF prepared in Comparative Example 2.

As shown in FIG. 12, N release rates of UF, AARP-UF, and AARPFe-UF were all fast in the early stages. After 15 days, the N release rate of UF was decreased, while the N release rates of AARP-UF and AARPFe-UF were decreased after 10 days. For UF, approximately 25% of the N was released on the first day, namely, the initial N release rate of UF was about 25%. While the initial N release rates of AARP-UF and AARPFe-UF were 18% and 15%, respectively. The cumulative N release rates of UF, AARP-UF, and AARPFe-UF at day 42 were 67.58%, 30.51%, and 26.52%, respectively, indicating that the nutrient release rate of the urea-formaldehyde modified fertilizer was significantly lower than that of the pure urea-formaldehyde fertilizer UF. Moreover, the semi-interpenetrating network structure was formed between the Fe amino acid chelate and UF to modify UF, further reducing the nutrient N release rate of the modified UF.

Figure 13:
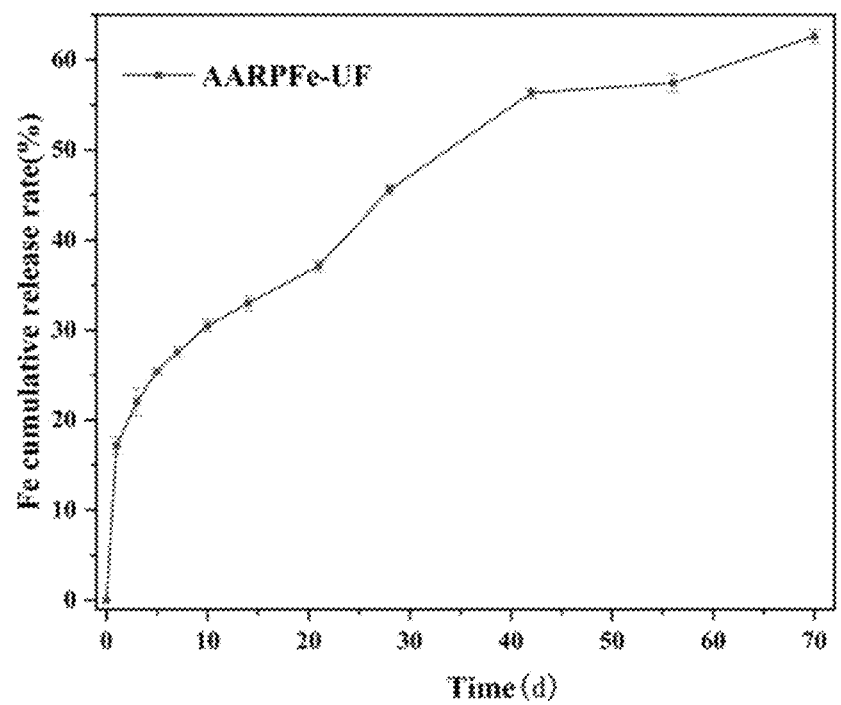
FIG. 13 shows the Fe cumulative release rate curve of the AARPFe-UF prepared in Example 1.

As shown in FIG. 13, the AARPFe-UF fertilizer released 21% Fe after 1 day. The Fe release was slow in the first 14 days and then became faster. The Fe cumulative release rate was 62.6% after 70 days. The Fe nutrients were released into the solution through slow hydrolysis and dissolution, showing a good slow-release performance, which further proved that a chelate structure was formed between AARP and Fe, and AARPFe-UF had a semi-interpenetrating network structure.

Described above are merely specific embodiments of the present disclosure to enable one of ordinary skill in the art to understand or implement the present disclosure. Notwithstanding the present disclosure has been described in detail above with reference to the embodiments, it should be understood that one of ordinary skill in the art can still make various modifications and equivalent substitutions thereto. Those modifications or substitutions made without departing from the spirit of the disclosure shall fall within the scope of the present disclosure defined by the appended claims.

What is claimed is:

1. A microelement amino acid chelate-urea formaldehyde (UF) slow-release fertilizer, comprising:
    a biodegradable UF polymer; and
    a chelate of a microelement and an amino acid;
    wherein macromolecular chains of the biodegradable UF polymer interpenetrate in a cross-linked network structure of the chelate, so as to form a polymer composite with a semi-interpenetrating network structure.

2. The microelement amino acid chelate-UF slow-release fertilizer of claim 1, wherein the amino acid is selected from the group consisting of glycine, aspartic acid, arginine, histidine, and a combination thereof.

3. The microelement amino acid chelate-UF slow-release fertilizer of claim 1, wherein the microelement is selected from the group consisting of iron, copper, zinc, manganese, boron, and a combination thereof.

4. The microelement amino acid chelate-UF slow-release fertilizer of claim 1, wherein a nitrogen nutrient content in the polymer composite is 25-40 wt. %.

5. A method of preparing the microelement amino acid chelate-UF slow-release fertilizer of claim 1 by reactive extrusion, comprising:
    (S1) feeding formaldehyde and urea to a reactor to form a first reaction system; and adjusting a pH of the first reaction system followed by a reaction to obtain a hydroxymethylurea solution;
    (S2) dissolving an amino acid in the hydroxymethylurea solution followed by addition of a microelement-containing compound to form a second reaction system; and adjusting a pH of the second reaction system;
    (S3) sealing a die opening between a reaction unit and an extrusion unit of a reaction-extrusion integrated machinery; and feeding the second reaction system into a reaction extruder of the reaction unit of the reaction-extrusion integrated machinery;
    (S4) turning on a screw of the reaction extruder to allow the second reaction system to undergo a reaction at a first preset temperature and a first preset rotation speed, and simultaneously starting a vacuumization-devolatilization device of the reaction extruder to remove water, so as to obtain a third reaction system;
    (S5) opening the die opening between the reaction unit and the extrusion unit; turning on a twin-screw extruder of the extrusion unit; conveying, by the screw of the reaction extruder, the third reaction system to the twin-screw extruder; and extruding, by the twin-screw extruder, the third reaction system at a second preset temperature and a second preset rotation speed to obtain a strip-shaped extrudate; and
    (S6) drying the strip-shaped extrudate followed by granulation to obtain the microelement amino acid chelate-UF slow-release fertilizer in a form of a cylindrical granule.

6. The method of claim 5, wherein in step (S1), a molar ratio of the urea to the formaldehyde is 1-2:1; the first reaction system is adjusted to pH 7-9; and the reaction is performed at 30-60° C. for 0.5-3 h.

7. The method of claim 5, wherein in step (S2), the amino acid is 5-40% by weight of hydroxymethylurea contained in the hydroxymethylurea solution; the microelement-containing compound is 1-17% by weight of the hydroxymethylurea contained in the hydroxymethylurea solution; and the second reaction system is adjusted to pH 4-7.

8. The method of claim 5, wherein in step (S2), the microelement-containing compound is selected from the group consisting of ferrous sulphate, copper sulphate, zinc sulphate, boric acid, manganese sulphate, and a combination thereof.

9. The method of claim 5, wherein in step (S4), the first preset temperature is 40-80° C.; the first preset rotation speed is 100-150 rpm; and the reaction is performed for 0.5-3 h.

10. The method of claim 5, wherein in step (S5), the second preset temperature is 40-80° C.; and the second preset rotation speed is 100-150 rpm.

* * * * *